United States Patent
DeMarco et al.

(10) Patent No.: US 6,612,772 B1
(45) Date of Patent: Sep. 2, 2003

(54) DEVICE FOR SECURING OBJECT TO HOLLOW POST OR PIPE

(75) Inventors: Robert DeMarco, Fresh Meadows, NY (US); Anthony Yodice, Staten Island, NY (US); William J. Hrubes, Ridgewood, NY (US)

(73) Assignee: Parking Meter Security Devices, Corp., Staten Island, NY (US)

( * ) Notice: Subject to any disclaimer, the term of this patent is extended or adjusted under 35 U.S.C. 154(b) by 537 days.

(21) Appl. No.: 08/835,945

(22) Filed: Apr. 10, 1997

(51) Int. Cl.[7] .................................................. E04B 1/48
(52) U.S. Cl. ....................... 403/256; 403/260; 403/378; 403/373
(58) Field of Search ................................. 403/230, 231, 403/245, 286, 257, 258, 259, 260, 292, 294, 378, 379, 373, 150, 161; 44/104, 433, 427; 194/350; 232/15, 16; 368/90, 91, 92

(56) References Cited

U.S. PATENT DOCUMENTS

| | | | | |
|---|---|---|---|---|
| 1,096,235 A | * | 5/1914 | Fox ........................ 464/134 X |
| 1,441,729 A | * | 1/1923 | Krejci ........................ 403/150 |
| 1,841,764 A | * | 1/1932 | Solver ..................... 403/150 X |
| 2,649,104 A | * | 8/1953 | Militano ................. 403/379 X |
| 2,717,753 A | * | 9/1955 | Schweikert ............. 403/161 X |
| 2,796,264 A | * | 6/1957 | Schiler ................... 403/334 X |
| 3,065,009 A | * | 11/1962 | Austin .................... 403/343 X |
| 3,721,463 A | * | 3/1973 | Attwood et al. ............ 403/258 |
| 3,884,002 A | * | 5/1975 | Logie ..................... 403/292 X |
| 4,030,846 A | * | 6/1977 | Flototto ..................... 403/231 |
| 4,261,665 A | * | 4/1981 | Hsiung ..................... 403/231 |
| 4,693,656 A | * | 9/1987 | Guthrie ..................... 411/433 |
| 4,798,273 A | * | 1/1989 | Ward, II ................... 194/350 |
| 4,981,388 A | * | 1/1991 | Becken et al. ............. 403/258 |
| 4,986,406 A | * | 1/1991 | Winsor ..................... 194/350 |
| 5,289,758 A | * | 3/1994 | Berlinger ............... 403/150 X |

FOREIGN PATENT DOCUMENTS

| | | | | |
|---|---|---|---|---|
| FR | 755464 | * | 9/1933 | ................. 403/57 |
| FR | 890023 | * | 1/1944 | ............... 403/379 |
| FR | 1386323 | * | 12/1964 | ............... 403/258 |

OTHER PUBLICATIONS

Snap–On Tools 1991–1992 Catalog, p. 233.*

* cited by examiner

Primary Examiner—Lynne H. Browne
Assistant Examiner—John R Cottingham
(74) Attorney, Agent, or Firm—Marguerite Del Valle

(57) ABSTRACT

A device for securing an object to the end of a hollow post or pipe, such as a parking meter head, comprising a bar capable of being transversely disposed within the hollow post or pipe by passing substantially the entire length of the bar through an opening in the side of the hollow post or pipe, the end of the bar first passed through the opening being configured to be received by an alteration in the inside surface of the hollow post or pipe located opposite the opening, the bar being further configured so as to substantially impede its rotation when disposed in the hollow post or pipe and to accept a fastener inserted through the end of the hollow post or pipe for securing the object to the bar.

13 Claims, 1 Drawing Sheet

DEVICE FOR SECURING OBJECT TO HOLLOW POST OR PIPE

BACKGROUND OF THE INVENTION

This invention provides an improved means for securely attaching an object, such as a parking meter housing, lamp fixture, coin or collection box or other electrical or mechanical device to a hollow post, pipe or conduit, under conditions where the object is subject or vulnerable to theft or vandalism, yet must be easily removed for repair or maintenance by its owner or authorized employees.

Conventional devices used for this purpose include an expanding anchor nut and wedge assembly similar to that disclosed in U.S. Pat. No. 4,798,273 to Ward. When a bolt is tightened down on the nut of this device, the assembly expands, causing wedges to press against the inside walls of a hollow post, holding the parking meter assembly to the post by friction. This device has been known to fall prey to determined parking meter thieves equipped with sledge hammers, heavy pipes or the like. Sharp upward impacts will succeed in removing the meter assembly from the post. The wedge device simply does not provide a sufficiently secure attachment under these circumstances.

It has been attempted to strengthen the wedge type attachment of parking meters to their posts by drilling a small diameter hole through the post and into a portion of the meter head extending downward into the post, and then driving a pin through the wall of the post and into the meter head. This, however, added little strength to the connection. The small diameter of the pin, combined with its position in only one side of the post, still allowed the removal of the meter head by a well equipped and determined criminal. Moreover, in order for an authorized attendant to remove the meter head from its post, the pin had to be driven into the center of the meter head or, if that was not possible, the meter head had to be cut from the post.

Moreover, wedging type devices are generally not reusable, as when one loosens and removes the bolt from the device in order to remove the meter assembly for repair or replacement, the wedge device often falls to the bottom of the hollow post, which is cemented to the ground. In that case, the several pieces of the device are normally not recoverable by any practical means. When the wedging device does not fall down into the post upon removal of the bolt, it is often because the device has rusted and has therefore become frozen in its expanded position. Also, the relatively weak nut of this wedging assembly often splits or cracks upon the bolt having been tightened upon it, and is thus not reusable. Finally, these wedging devices, having several interconnected moving parts made of various materials, are relatively expensive to manufacture.

Another wedging type device which requires a noncylindrical post is disclosed in U.S. Pat. No. 3,721,463 to Attwood. That is an impractical solution, in that, for practical and economic reasons, posts serving in this capacity must be, and uniformly are, of the cylindrical type.

U.S. Pat. No. 4,986,406 to Winsor discloses a solid metal capture cylinder which fits inside a post at its upper end. A double headed locking pin fits through a transverse bore in the capture cylinder, its heads each resting within one of two diametrically opposed holes in either side of the post, which holes are aligned with the bore. The diameter of the pin heads are approximately the same as the diameter of the holes in the post within which they rest, but the diameter of the central portion of the pin is less than that of the heads, the holes in the post, and the bore of the capture cylinder. Thus, when a clamping bolt inserted downward from the meter head and threaded into the top of the capture cylinder is tightened, the capture cylinder is drawn upward, moving relative to the locking pin due to the differential shift created by the varying diameters of the bore and the central section of the pin. The pin is then secured within the post and the capture cylinder, prevented from sideways withdrawal, due to the partially offset positions of the pin heads and the bore of the capture cylinder. This is a relatively complicated and expensive means for securing a meter head to a post. Its installation is difficult and time consuming. It is not known that the device was ever commercially used or practically applied.

Another device for attaching a parking meter head to a post is disclosed in U.S. Pat. No. 2,311,242 to Michaels. A pin having tapered ends is inserted into diametrically opposed openings in a post by lowering it into the top of the post, angling the pin to insert one of its ends into one of the holes, and then leveling the pin to insert its other end into the opposing opening of the post. The meter head is then placed on top of the post, and a bolt from the meter head is threaded into a vertical opening in the central enlarged portion of the pin. A cylinder extending downward from the meter head and having an inside diameter slightly larger than the outside diameter of the post extends down far enough to cover the exposed ends of the pin to secure against its removal or tampering. The use of the pin disclosed in Michaels requires that the spider or other bottom portion of the meter head through which the bolt is inserted extend no farther down into the post than would permit the manual reach required to insert the pin from the top of the post. The design of the pin disclosed in Michaels requires insertion from the opening in the top of the post. Due to its taper and varying diameters, it cannot be inserted through the diametrically opposed openings in the post, from outside the post. The pin must be of a diameter great enough to receive a substantially large and strong bolt at the center, yet be of a small enough diameter at the ends to permit its installation in the post from the inside, as disclosed, and at an angle. Moreover, without the protective sleeve which covers the ends of the pin when installed in the post, the pin would be subject to tampering from the outside. Yet, the protective sleeve, installed with the meter head prior to inserting and tightening the bolt as disclosed in Michaels, prevents the installer from maintaining or adjusting the rotational position of the pin so that its threaded opening points vertically toward the bolt and can receive it. Finally, the reduced, tapered ends of the pin, required to permit the pin to be installed into the openings in the post from the inside, one at a time and at an angle, reduces the overall strength of the securing mechanism. The varying stages of lathing make the tapered pin a relatively expensive one to manufacture.

SUMMARY OF THE INVENTION

The present invention provides a means for securing an object to a hollow post or pipe which prevents theft of the object by removal from the post, while providing a device which is cheaply made, easy to install, reusable and compatible with the post and parking meter head designs presently used by most municipalities.

The present invention utilizes a bar which can be made of a strong material such as hardened steel and which can have a cross dimension great enough to provide the strength needed to prevent the unauthorized forcible removal of a valuable meter head or other object by a strong individual using a heavy duty sledge hammer or other heavy swinging tool. The transverse disposition of the bar in the hollow post or pipe in that both of its ends are or can be disposed within openings in the wall of the pipe, adds substantial strength to the attachment of the object to the pipe in that the bar cannot be urged from its substantially transverse position by bending or angling out of one opening which could otherwise be caused by the upward impacts of the vandal's tool.

The bar can be inexpensively machined from round stock stainless steel without further lathing of its diameter and with minimum steps and labor. In the preferred embodiment of this invention, the stock stainless steel need only be cut to a predetermined length, a transverse bore drilled in it and threaded and its ends curved to the proper radius using a cutting or grinding tool. A countersink is preferably formed at the opening of the threaded bore to guide the bolt being manually inserted by the installer. The cost of manufacturing this bar is nearly one-third the cost of manufacturing the wedging type device now in use in most municipalities.

This invention can easily be installed to secure an object to a hollow post or pipe or to replace the existing mode of attachment of the object and reattach it more securely to the post. In the preferred embodiment of this invention, a round hole of the approximate diameter of the cylindrical bar is transversely drilled through the central axis of the pipe sufficiently below any lower portion of the object extending down into the pipe yet near enough the object to enable the fastener, such as a threaded bolt, to reach the bar. The bar can then be installed in the pipe by inserting it through one of the drilled openings in the side of the pipe until its inserted end engages an alteration in the inside surface of the pipe opposite the opening, in the preferred embodiment, another opening of the same size and shape. The object, for example, a parking meter head, is then placed on top of the pipe. A bolt or other fastener, aligned generally in an axial direction with respect to the hollow post or pipe, is then passed through a secured access such as a locked vault door and inserted into a hole in the bottom of the meter head. The bolt is then aligned with the transverse opening in the bar and drawn down, tightening the assembly and securing the meter head to the post. In the preferred embodiment of this invention, the bar is then rotationally aligned so that its transverse bore is positioned to receive the securing bolt, and a sleeve is placed over the post prior to placement of the meter head on the post.

The securing means of this invention permits the easy removal of the meter head or other object for repair or replacement, while avoiding damage to the post or object in the process and allowing reuse of the bar and securing bolt. When the meter head is removed by loosening the bolt using a wrench or other tool passed through the vault door, the bar remains held in the side openings of the post, where it can be recovered by the attendant. Its construction from a single, solid piece of stainless or galvanized steel or other corrosion resistant and durable material permits its reuse under conditions where its predecessors failed.

Most parking meter heads in use in the United States today are attached to a cylindrical hollow post or pipe which is embedded in a concrete sidewalk. The integral bottom portion of the meter head extends approximately 2¼ inches down into the top opening of the meter head. Through an opening in the bottom portion of the meter head is passed a bolt, which threads into the nut of a wedge type expansion assembly of the type discussed previously in connection with the background of this invention. The bar of this invention can easily be transversely disposed within the pipe in a position allowing sufficient clearance for the downward extending bottom portion of the meter head in that the bar is inserted through a side opening in the pipe, rather than through the top opening, which is generally too far away from the required position of the bar to be reached manually by the installer.

The parking meter post design currently in use in the United States also often incorporates an outer sleeve having an inside diameter slightly larger than the outside diameter of the post, so that the sleeve can be slipped over the post prior to attachment of the meter head. The sleeve, having a length approximating the exposed length of the post extending from the surface of the sidewalk to the base of the meter head, rests on the surface of the sidewalk and adds security to the attachment of the meter head to the post by covering any additional securing pin driven through a side of the post and into the body of the meter head and by preventing the removal of the meter head by use of a pipe cutter on the post: the outer sleeve rotates around the post with the pipe cutter, resisting being severed by the rotating pipe cutter, and generally provides another steel layer against cutting or breaking. In the preferred embodiment of this invention, the curved ends of the bar cooperate with the outer sleeve to substantially impede rotation of the bar after its insertion in the post so that the threaded bore is maintained substantially axially aligned to receive the threaded bolt. The curved shape of the ends of the bar also have the benefit of permitting the maximum length of the bar to be disposed within the walls of the post without protruding beyond its outside surface or when closely surrounded by such a sleeve, in turn maximizing the holding strength of the bar in the post. This latter benefit is thus also realized In embodiments of this invention which contemplate the use of a fastener other than a threaded bolt to secure the object to the bar and hence the post, such as a hooked or "j" bolt or other fastening device.

DETAILED DESCRIPTION OF THE INVENTION

Figure 1:
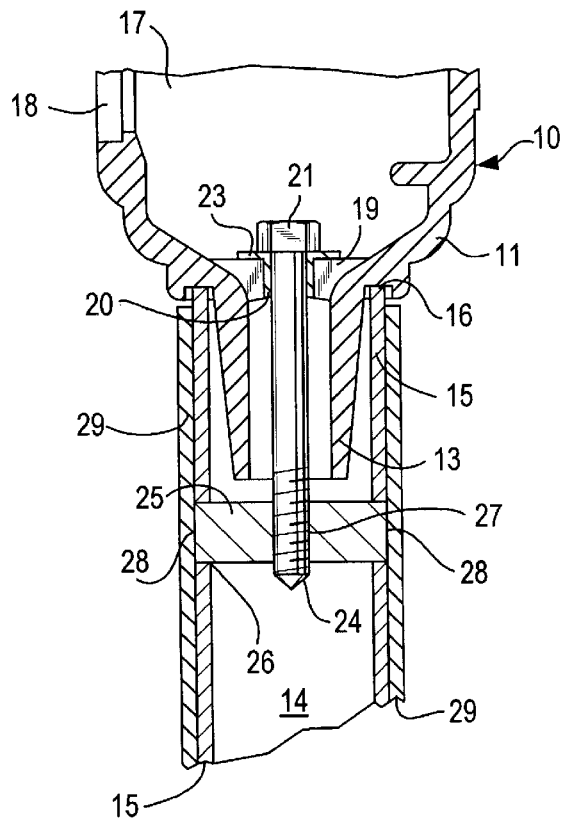
FIG. 1 is an axial section view of the lower portion of a parking meter head as attached to a hollow post by a preferred embodiment of the securing device of this invention.
Figure 2:
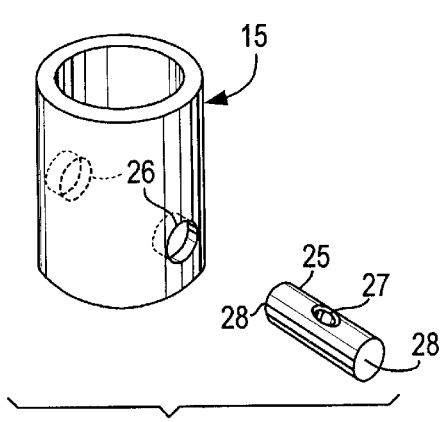
FIG. 2 is a perspective, exploded view of the embodiment of FIG. 1 showing several components of the invention.

In the drawings, FIG. 1 illustrates the lower portion of a typical parking meter head 10 having a bottom casing 11, formed with a mounting base 19 which includes a portion 13 which tapers downwardly about 2¼ inches or 57 mm into the hollow area 14 defined by the walls of a cylindrical hollow post or pipe 15. The post 15 is typically made of galvanized steel having an inside diameter of about 2 inches or 51 mm and an outside diameter of about 2⅜ inches or 60 mm. The top edge of the post 15 rests in a circular groove 16 provided at the bottom of the meter head 10. The lower casing 11 encloses a vault chamber 17 which can be accessed through a keyed vault door 18.

The mounting base 19 is formed with an axial opening 20 configured to receive a bolt 21. The bolt extends downwardly through a vertical channel or bore 22 formed coaxially with the opening 20 and mounting base 19. A washer 23 is disposed between the hexagon head of the bolt 21 and the mounting base 19. The distal end 24 of the bolt 21 is threaded into a bar 25 which is transversely disposed in diametrically opposed openings 26 in the post 15. The benefits of this invention can be realized without the use of a threaded bore and bolt, such as by forming a secure attachment between the bar and the object by use of a clamp, hooked "j" bolt or other fastening device.

Figure 3:
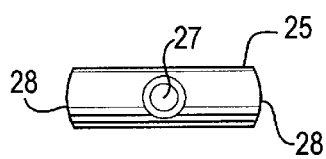
FIG. 3 is a top view of a component of the embodiment of FIG. 1.
Figure 4:
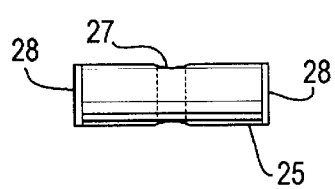
FIG. 4 is a side view of the component of FIG. 3.

Bar 25 is preferably cylindrical, as shown in FIGS. 1–4, and made from 1 inch or 25 mm diameter stainless steel round stock 303, a hard, corrosion resistant steel which can readily be machined to the desired size and shape. The length of bar 25 as measured along its axis is approximately equal to the outside diameter of post 15, as shown in FIG. 1. The bar is drilled with transverse bore 27, threaded and configured to receive the threaded distal end 24 of the bolt 21. The ends 28 of the bar 25 are curved at a radius about equal to the radius of the outside diameter of post 15. This can be achieved using a tool having a cutting or grinding surface which has the same curvature by virtue, for example, of its being mounted on the inside surface of a cylindrical housing, or otherwise being capable of being moved along the radius. Threaded bore 27 in bar 25 is preferably countersunk, as shown in FIGS. 3 and 4, to facilitate its alignment with distal end 24 of bolt 21 during installation of bar 25 in openings 26 of post 15. As shown in FIGS. 1, 3 and 4, when threaded bore 27 is aligned coaxially with bolt 21 and channel 22, the curved ends 28 are substantially flush with the outside diameter of post 15. This is possible due to the relative configurations of ends 28 and bore 27 of bar 25: in making bar 25, the axis of bore 27 also preferably defines all points from which the radius is measured in forming the curvature of ends 28. The resulting configuration of bar 25 is depicted in the drawings.

The bottom of post 15 is typically embedded in a concrete sidewalk, which is not shown. A protective cylindrical sleeve 29, typically made of galvanized steel and having an inside diameter of about 2½ inches or 63 mm and an outside diameter of about 2⅞ inches or 73 mm, surrounds the outside of the post 15, as shown in FIG. 1. The sleeve 29 rests freely on the surface of the floor or concrete sidewalk (not shown), and extends upward to a point below the meter head casing 11, as shown in FIG. 1. The sleeve 29 is therefore able to revolve freely around post 15.

A parking meter head or other object is secured to a hollow post or pipe in the preferred embodiment of this invention by first drilling in post 15 two transverse openings 26, the openings having approximately the same dimensions as the cross section of bar 25. In the drawings, openings 26 are drilled to a diameter slightly greater than the diameter of bar 25, so that bar 25 can be easily passed through one of openings 26 and through post 15 to the transversely opposed opening 26 and can rotate freely in openings 26 without excessive clearance between bar 25 and openings 26. Bar 25 is then manually adjusted in openings 26 until bore 27 is axially aligned with vertical channel 22. Sleeve 29 is then slid over post 15 and gently lowered to the floor or concrete sidewalk. Bar 25, due to its dimensions and the curvature of its ends 28, is substantially prevented by the sleeve from further rotation or sideways movement. Thus, bore 27 remains substantially axially aligned with vertical channel 22 to facilitate the installer's alignment and threading of bolt 21 into bore 27. Meter head 10 is then placed on post 15 so that the top edge of the post rests in circular groove 16. Bolt 21, if it was not inserted in opening 20 of mounting base 19 prior to the placement of meter head 10 on post 15, is then inserted manually through opening 20 via the access provided by vault door 18. The bolt is aligned with bore 27, threaded therein and drawn down to an appropriate torque using a wrench or other tool. The vault door is closed and locked and the parking meter is ready for normal operation.

It is contemplated that post 15 could be fitted with one opening 26, rather than two, and that another alteration (not shown) in the inside surface of the post for receiving the end of bar 25 could be positioned diametrically opposite the opening 26 through which bar 25 is to be passed. One such means might be a indentation in the inside wall of post 15, diametrically opposite opening 26 and configured to receive the first inserted end of bar 25. In such a configuration, only one end of bar 25 need have the curvature of end 28 in the drawings, and the end intended to be first inserted in through opening 26 could be of any other shape or configuration so as to be adequately disposed within the diametrically opposed means. In any configuration contemplated by this invention, including one having two diametrically opposed openings in post 15 such as openings 26 in the drawings, only one end of the bar need be configured to prevent rotation of the bar in cooperation with a sleeve or otherwise, so long as the length of the bar is great enough to engage with means to prevent such rotation or to cooperate with a sleeve such as sleeve 29 in the drawings. For example, a cylindrical bar having only one of its ends configured in a curvature such as that of end 28 in the drawings, the other end, for example, being cut off straight and perpendicular to the axis of the bar, would adequately provide the anti-rotational means of the preferred embodiment of this invention so long as its length is such that its curved end is urged into close proximity with the inside surface of the outer sleeve, so that upon attempted rotation its rotation is impeded by contact of its curved end with the inside surface of the sleeve. Also, a bar having a noncircular cross section at least at one end, when disposed in openings or other means appropriately configured to engage the end and substantially impede rotation of the bar, will perform this anti-rotational function so long as such end of the bar is engaged by that means or opening.

The securing device of this invention is disengaged for easy removal of the meter head or other object from the post generally by a reversal of the steps for installation as described above. The head of the bolt 21 is accessed through the keyed vault door 18 and is loosened with a wrench or other appropriate tool. The bolt is removed manually, and the meter head removed from the top of post 15. If the meter head is to be repaired or replaced on site, bar 25 is left in openings 26 of the post, along with sleeve 29 if provided. If the post must be left unattended, the sleeve 29 can be slipped off of pipe 15 and removed, and bar 25 can be manually removed through one of openings 26 and kept in a secure place with the removed meter head until such time as the meter head, bar and sleeve are to be replaced on the post.

While the foregoing embodiments are considered to be preferred, it is to be understood that variations and modifications within the invention may be made by persons skilled in the art and that the invention is not limited to the illustrations and disclosed embodiments but also encompasses in the appended claims all variations, modifications and equivalents within the true spirit and scope of the invention.

We claim:

1. A device for securing an object having a secured access to its interior to an end of a hollow post or pipe, comprising a bar capable of being transversely disposed in the hollow post or pipe by passing substantially the entire length of the bar through an opening in the side of the hollow post or pipe, the bar being attachable to the object by a removable threaded fastener which has been passed through the secured access in the object and axially disposed in the hollow post or pipe and wherein the hollow post or pipe is cylindrical and at least one end of the bar is curved to conform to an outside surface of the hollow post or pipe.

2. A device according to claim 1, wherein rotation of the bar is substantially impeded when a sleeve is placed over the hollow post or pipe.

3. A device according to claim 2 the sleeve is cylindrical and at least one end of the bar is curved to conform to an inside surface of the sleeve.

4. A device according to claim 3 wherein the bar is further comprised of a transverse bore to receive the fastener.

5. A device for securing an object having a secured access to its interior to an end of a hollow post or pipe, comprising a bar capable of being transversely disposed in the hollow post or pipe and attachable to the object by a removable threaded fastener which has been passed through the secured access in the object and axially disposed in the hollow post or pipe, the bar capable of being further disposed so that its rotation is substantially impeded before it is attached by the fastener and wherein the hollow post or pipe is cylindrical and at least one end of the bar is curved to conform to an outside surface of the hollow post or pipe.

6. A device according to claim 5 wherein the bar is further comprised of a transverse bore to receive the fastener.

7. A device according to claim 6 wherein rotation of the bar is substantially impeded when a sleeve is placed over the hollow post or pipe.

8. A device according to claim 7 wherein the sleeve is cylindrical and at least one end of the bar is curved to conform to an inside surface of the sleeve.

9. A device comprising a bar, meter or collection device, and a hollow post or pipe wherein the bar is transversely disposed in an opening in a side of the hollow post or pipe, and the bar has no cross-dimension greater than a greatest cross-dimension of the opening, and is directly attached to the meter or collection device by a fastener axially disposed in the hollow post or pipe.

10. A device according to claim 9 wherein the hollow post or pipe is cylindrical and at least one end of the bar is curved to conform to an outside surface of the hollow post or pipe.

11. A device comprising a bar, meter or collection device, and a hollow post or pipe wherein the bar is transversely disposed in an opening in a side of the hollow post or pipe, and the bar has no cross-dimension greater than a greatest cross-dimension of the opening, and is attached to the meter or collection device by a fastener axially disposed in the hollow post or pipe, and wherein rotation of the bar is substantially impeded by a sleeve placed over the hollow post or pipe.

12. A device according to claim 11 wherein the sleeve is cylindrical and at least one end of the bar is curved to conform to an inside surface of the sleeve.

13. A device according to claim 12 wherein the bar is further comprised of a transverse bore to receive the fastener.

* * * * *